United States Patent
Christidis et al.

(10) Patent No.: US 10,360,191 B2
(45) Date of Patent: Jul. 23, 2019

(54) ESTABLISHING OVERLAY TRUST CONSENSUS FOR BLOCKCHAIN TRUST VALIDATION SYSTEM

(71) Applicant: International Business Machines Corporation, Armonk, NY (US)

(72) Inventors: Konstantinos Christidis, Durham, NC (US); Anna D. Derbakova, Durham, NC (US); Nitin Gaur, Austin, TX (US); Praveen Jayachandran, Bangalore (IN); Srinivasan Muralidharan, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 285 days.

(21) Appl. No.: 15/288,435

(22) Filed: Oct. 7, 2016

(65) Prior Publication Data

US 2018/0101560 A1 Apr. 12, 2018

(51) Int. Cl.
*G06F 16/14* (2019.01)
*G06F 16/182* (2019.01)
(Continued)

(52) U.S. Cl.
CPC .......... *G06F 16/215* (2019.01); *G06F 16/152* (2019.01); *G06F 16/1837* (2019.01);
(Continued)

(58) Field of Classification Search
CPC .. G06Q 20/383; G06Q 20/027; G06Q 20/382; G06Q 20/3829; G06Q 20/401;
(Continued)

(56) References Cited

U.S. PATENT DOCUMENTS 9,298,806 B1    3/2016   Vessenes et al.
9,875,510 B1 *   1/2018   Kasper .................. G06Q 40/12
(Continued)

FOREIGN PATENT DOCUMENTS

WO    WO2016029119 A1    2/2016

OTHER PUBLICATIONS

Luu, L., "SCP: A Computationally-Scalable Byzantine Consensus Protocol for Blockchains", http://eprint.iacr.org, Dec. 4, 2015, pp. 1-16.

*Primary Examiner* — James Trujillo
*Assistant Examiner* — Michal Lawrence Bogacki
(74) *Attorney, Agent, or Firm* — Scully, Scott, Murphy & Presser, P.C.; Joseph Petrokaitis, Esq.

(57) ABSTRACT

The system, method, and computer program product described herein provides a built-in feedback mechanism for a blockchain to sanction validator nodes that consistently "vote" in a manner that does not match the ultimate consensus. The method includes receiving a vote on whether to add a transaction to the blockchain, comparing the vote to a consensus decision on whether to add the transaction to the blockchain, determining based on the comparison that the vote does not match the consensus decision, in response to determining that the vote does not match the consensus decision, incrementing a value associated with the validator node in a feedback registry, determining that the value associated with the validator node is above a predetermined threshold value, and in response to determining that the value associated with the validator node is above the predetermined threshold, proposing a sanction of the validator node to the plurality of validator nodes.

20 Claims, 5 Drawing Sheets

(51) Int. Cl.
  *H04L 9/32* (2006.01)
  *G06F 16/215* (2019.01)
  *G06F 16/18* (2019.01)
(52) U.S. Cl.
  CPC ........ *G06F 16/1865* (2019.01); *H04L 9/3236* (2013.01); *H04L 9/3297* (2013.01); *H04L 2209/38* (2013.01); *H04L 2209/56* (2013.01)
(58) Field of Classification Search
  CPC .. G06Q 40/12; G06Q 30/029; G06F 21/6218; H04L 41/0813; H04L 9/3247; H04L 63/08
  See application file for complete search history.

(56) References Cited

U.S. PATENT DOCUMENTS

| | | | | |
|---|---|---|---|---|
| 2008/0151846 | A1* | 6/2008 | Scheinert | H04B 7/2606 370/338 |
| 2008/0208072 | A1* | 8/2008 | Fadem | A61B 5/0484 600/544 |
| 2010/0017644 | A1* | 1/2010 | Butterworth | G06F 11/1658 714/4.1 |
| 2010/0185343 | A1* | 7/2010 | Broquet | G01P 13/025 701/3 |
| 2013/0070997 | A1* | 3/2013 | Tajbakhsh | G06K 9/62 382/131 |
| 2014/0310243 | A1 | 10/2014 | McGee et al. | |
| 2015/0033301 | A1* | 1/2015 | Pianese | H04L 63/083 726/5 |
| 2015/0310687 | A1* | 10/2015 | Morgia | G06Q 10/10 705/12 |
| 2015/0332283 | A1 | 11/2015 | Witchey | |
| 2015/0356524 | A1 | 12/2015 | Pennanen | |
| 2016/0028552 | A1 | 1/2016 | Spanos et al. | |
| 2016/0098723 | A1 | 4/2016 | Feeney | |
| 2016/0323393 | A1* | 11/2016 | Umphreys | H04L 67/18 |
| 2017/0236120 | A1* | 8/2017 | Herlihy | G06Q 20/3827 705/67 |
| 2017/0289134 | A1* | 10/2017 | Bradley | G06F 17/30283 |
| 2018/0063238 | A1* | 3/2018 | Zhang | H04L 67/1051 |
| 2018/0204191 | A1* | 7/2018 | Wilson | G06Q 20/3829 |

\* cited by examiner

ESTABLISHING OVERLAY TRUST CONSENSUS FOR BLOCKCHAIN TRUST VALIDATION SYSTEM

TECHNICAL FIELD

The present disclosure relates to blockchain technologies.

BACKGROUND

Blockchain technology was developed as a way of providing a publicly transparent and decentralized ledger that is configured to track and store digital transactions in a publicly verifiable, secure, and hardened manner to prevent tampering or revision.

A typical blockchain includes three primary functions: read, write, and validate. For example, a user of the blockchain must have the ability to read the data that resides on the blockchain. A user of the blockchain must also have the ability to write, e.g. append, data to the blockchain. Every write operation starts out as a proposed transaction that is posted on the network. The proposed transaction may not always be valid, for example, it may be malformed (syntax errors), or it may constitute an attempt to perform a task for which the submitter is not authorized. Validation refers to filtering out invalid transactions and then deciding on the exact order for the remaining, valid, transactions to be appended to the blockchain. This process is often called consensus. During consensus, validator nodes of the blockchain may vote on whether each submitted transaction is valid and the order in which to add the transactions to the blockchain.

Once ordered, the transactions are packaged into blocks which are in turn appended to the blockchain. Each new block that is appended to the blockchain also includes a hash of the previous block. Accordingly, as each new block is added, the security and integrity of the entire blockchain is further enhanced. It is important to note that once data is written to the blockchain, for example, once a block including transactions has been appended to the blockchain, that data can no longer be altered or modified. In a typical blockchain, the anonymity of the users is protected through the use of pseudonyms and the transaction data itself is protected through the use of cryptography, e.g., via the use of hash codes.

BRIEF SUMMARY

The system, method, and computer program product described herein provides a build-in feedback mechanism for a blockchain to sanction validator nodes that consistently "vote" in a manner that is does not match the ultimate consensus.

In an aspect of the present disclosure, a method is disclosed. The method includes receiving a vote cast by a validator node associated with the blockchain on whether to add a block of transactions to the blockchain and comparing the vote to a consensus decision on whether to add the block of transactions to the blockchain. The consensus decision is reached based on votes by a plurality of validator nodes associated with the blockchain. The plurality of validator nodes may include the validator node. The method further includes determining based on the comparison that the vote does not match the consensus decision, in response to determining that the vote does not match the consensus decision, incrementing a value associated with the validator node in a feedback registry, determining that the value associated with the validator node is above a predetermined threshold value, in response to determining that the value associated with the validator node is above the predetermined threshold, proposing a sanction of the validator node to the plurality of validator nodes, receiving from the plurality of validator nodes a consensus decision on the sanction, applying the received consensus decision to at least one future vote received from the validator node.

In aspects of the present disclosure apparatus, systems, and computer program products in accordance with the above aspect may also be provided.

BRIEF DESCRIPTION OF THE DRAWINGS

The details of the present disclosure, both as to its structure and operation, can best be understood by referring to the accompanying drawings, in which like reference numbers and designations refer to like elements.

DETAILED DESCRIPTION

Figure 1:
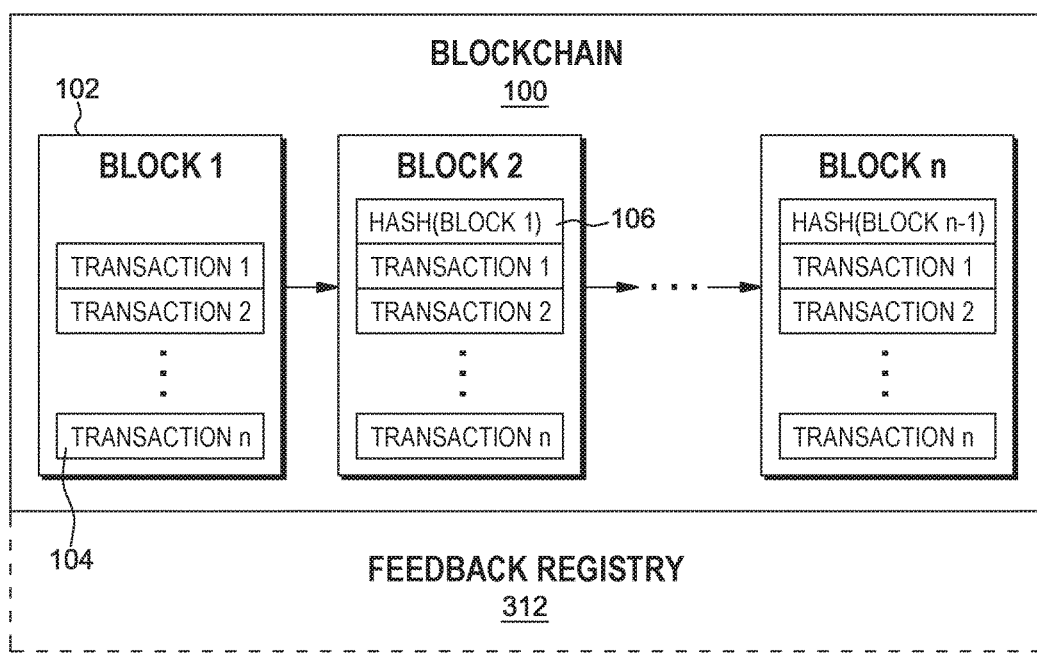
FIG. 1 is a system diagram illustrating a blockchain in accordance with an aspect of the present disclosure.

A blockchain relies on validator nodes, sometimes called miners, to validate new transactions that are submitted for addition to the blockchain. Often a blockchain will be implemented by a number of validator nodes run or operated by a variety of different entities or individuals. Depending on the particular blockchain, the number of validator nodes may vary dramatically. For example, a blockchain that has a high throughput, e.g., receives a large number of transactions per second, may be implemented by a large number of validator nodes. As the number of validator nodes increases, the level of trust in the blockchain also increases due to the additional votes during consensus. As the number of validator nodes increases, however, the time that it takes to reach consensus between the validator nodes is also likely to increase which may cause a performance bottleneck. Such a bottleneck may be undesirable as it decreases the blockchain's transaction throughput.

An increased time to reach a consensus among validator nodes may also become a problem in an environment which implements multiple blockchains on a single network of validator nodes. For example, one or more of the validator nodes may be providing validations and consensus services for more than one of the blockchains. The longer a particular validator node is tied up reaching a consensus for one blockchain, the less time and processing power that validator node has available to reach consensus for any of the other blockchains.

In some aspects, the amount of time to reach consensus may be based on how quickly a network of validator nodes can collect a threshold number of identical "votes", e.g., reach a consensus. Consider for example, the typical practical byzantine fault tolerance (PBFT) scenario (a certain number of validators will cast the wrong vote either maliciously or due to error) where a certain threshold of, say, K identical "votes" needs to be collected by the network of N (N>K) validator nodes before it can move on the next stage of the consensus phase, and finally reach consensus on a certain transaction or block of transactions. Now imagine first network A with no Byzantine validators, and second network B with M (M<N-K) Byzantine validators. In network A, the first K identical validator "votes" are enough to allow the network to move to the next phase. In contrast, for network B, assuming that at least one of the first K identical validator "votes" belongs to a Byzantine node, at least K+1 identical validator "votes" are needed before the network may move on to the next phase of consensus. Because the Byzantine fault tolerance scenario assumes that there are bad actors, networks with Byzantine nodes often require additional identical "votes" to reach consensus. In some aspects, a master node system may be used where, for example, one or more "master" or "leader" nodes may be specified that include a higher weight. For example, in some aspects, a master node system may require fewer identical votes so long as one of the identical votes is received from of a master node.

Because the network of validator nodes need only collect a certain number of identical "votes" before moving on to the next stage of consensus, the speed of consensus may be improved by using validator nodes that are likely to "vote" the same way. For example, if the threshold number of K identical "votes" is six votes, the fastest consensus will occur when the first six collected "votes" are identical. If any of the first six "votes" are not identical, for example, if four of the first six "votes" are positive and two of the first six "votes" are negative, the network of validators must wait to collect at least two more "votes" that are positive or at least four more "votes" that are negative to meet the threshold of six identical "votes". This may add additional time to the consensus process.

The present disclosure provides a build-in feedback mechanism for validator nodes of a blockchain to sanction the validator nodes that consistently "vote" in a manner that is does not match the ultimate consensus. For example, the voting of each validator node may be monitored and those validator nodes that consistently do not vote the way of the consensus may be sanctioned by reducing or removing the validator nodes role in future consensus decisions.

With reference now to FIG. 1, a blockchain 100 includes a plurality of data blocks 102. Each data block 102 is a data structure that includes data representing transactions 104, for example, smart contracts, payment receipts, or any other transaction. As described above, as new transactions 104 are submitted to the blockchain 100 and validated by validator nodes, additional data blocks 102 are generated by the validator nodes and appended to the blockchain 100. Each new data block 102 includes a set of validated transactions 104 and a hash 106 of the content of the immediately previous data block 102. For example, data block "2" includes a hash of the content of block "1", block "n" includes a hash of the content of block "n-1", etc. Some non-limiting examples of blockchains include Bitcoin®, Ethereum®, OpenLedger™, or other similar blockchains.

Figure 2:
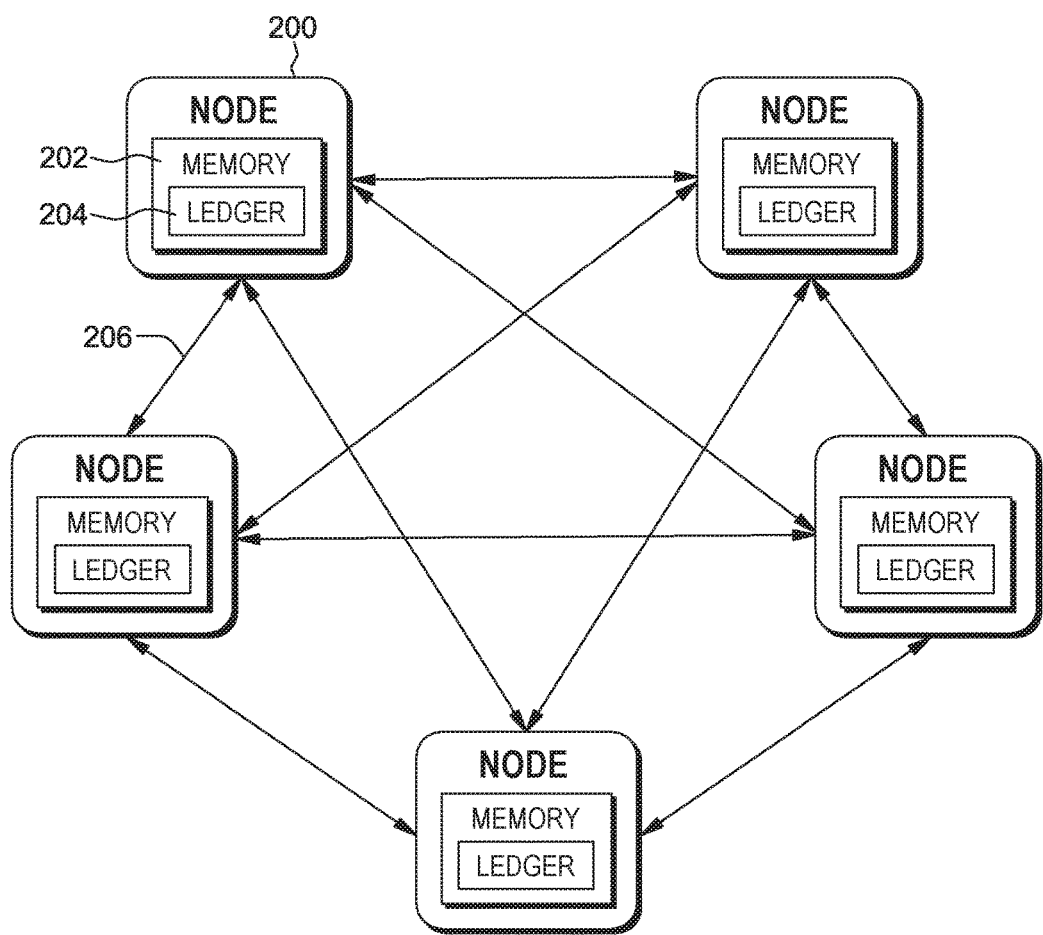
FIG. 2 is a system diagram illustrating nodes storing the ledger of the blockchain of FIG. 1 in accordance with an aspect of the present disclosure.

With reference now to FIG. 2, in some aspects, blockchain 100 is stored in a decentralized manner on a plurality of nodes 200, e.g., computing devices located in one or more networks. Nodes 200 may each include a memory 202 that stores at least a portion of a ledger 204 of blockchain 100. Ledger 204 includes any data blocks 102 that have been validated and added to the blockchain 100. In some aspects, every node 200 may store the entire ledger 204. In some aspects, each node 200 may store a portion of ledger 204. In some aspects, some or all of blockchain 100 may be stored in a centralized manner. Nodes 200 may communicate with one another via communication pathways 206, e.g., wired or wireless connections, over the internet, etc. to transmit and receive data related to ledger 204. For example, as new data blocks 102 are added to ledger 204, nodes 200 may communicate or share the new data blocks 102 via communication pathways 206.

Figure 3:
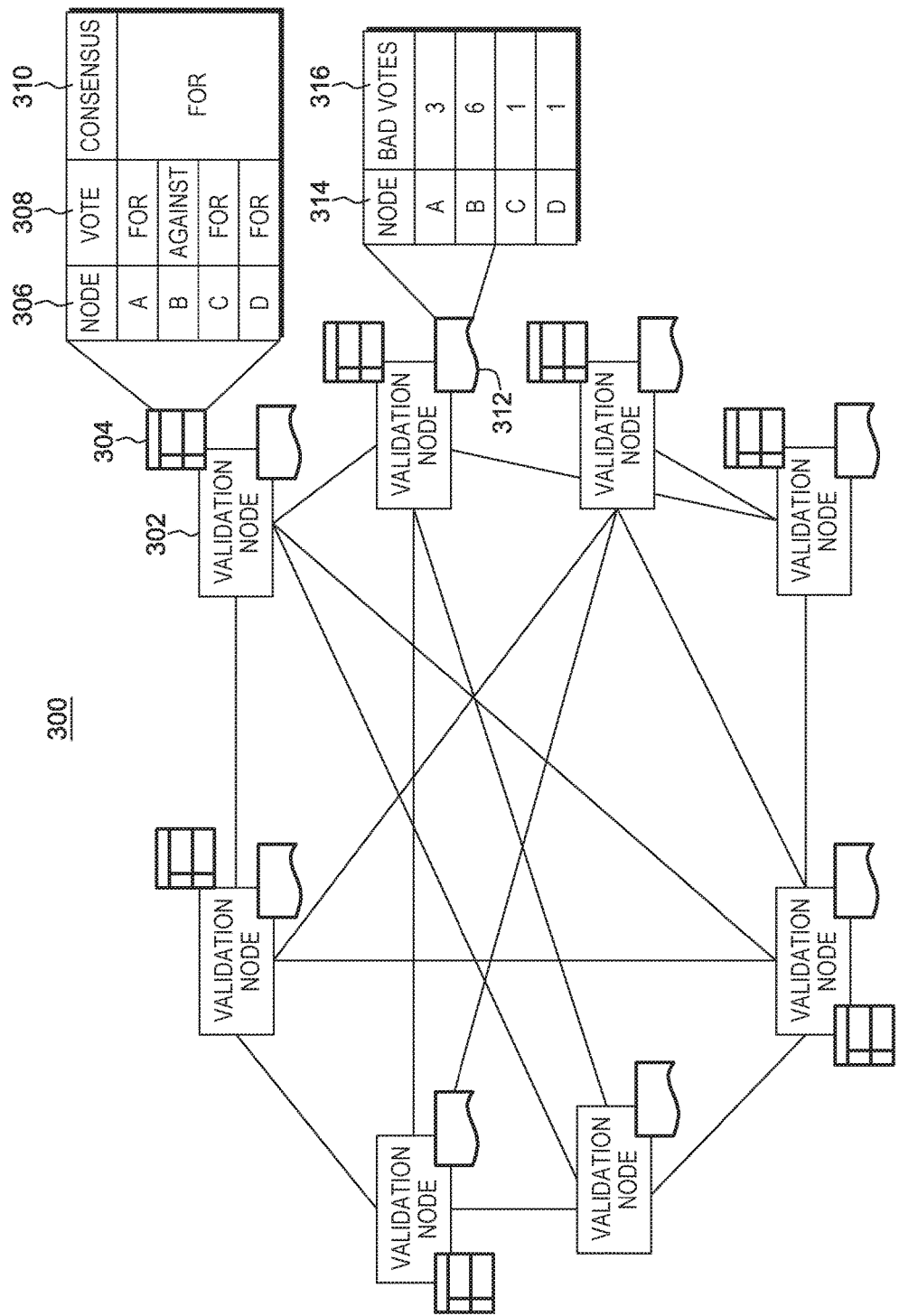
FIG. 3 is a system diagram illustrating validator nodes of the blockchain of FIG. 1 in accordance with an aspect of the present disclosure.

With reference now to FIG. 3, any transactions 104 submitted to blockchain 100 are validated by a set of validator nodes 300 associated with blockchain 100. For example, transactions 104 may be transmitted to one or more of the validator nodes 300 and may be shared between the validator nodes 300 for validation and consensus. Each validator node 302 determines whether a transaction 104 is valid and whether the transaction 104 complies with the rules of the blockchain 100. The validator node 302 adds a plurality of the validated transactions 104 to a data block 102 and submits the data block 102 for consensus by the other validator nodes 302. The other validator nodes 302 then vote "for" or "against" appending the data block 102 containing the transactions 104 to the blockchain 100. A consensus of the set of validator nodes 300, e.g., a threshold number of identical votes "for" or "against", is required to allow or deny the data block 102 to be appended to the blockchain 100. In some aspects, one or more of nodes 200 may also be validator nodes 302. In some aspects, nodes 200 that are not validator nodes 302 may perform processing such as, for example, receiving transaction submissions, providing member services, delivering events to applications, handling application programming interface (API) requests from users, or other similar functions. In this manner, the processing power of the validator nodes 302 may be preserved for generating new blocks, reaching consensus, and monitoring the other validator nodes 302.

In some aspects, each validator node 302 associated with the blockchain 100 may store in a memory 304 a record of the "votes" that every other validator node 302 in the network has cast for a consensus round. For example, record 304 may include an identification 306 of the validator nodes 302, e.g., nodes A, B, C, etc., a vote 308 for each validator node 302, and a consensus determination 310. For example, a validator node "A" may have a vote 308 of "for", a validator node "B" may have a vote 308 of "against", a validator node "C" may have a vote 308 of "for", a validator node "D" may have a vote 308 of "for", and the consensus determination 310 may be "for". At the end of every consensus round, the validator nodes 302 may compare the "votes" 308 of all of the other validator nodes 302 with the consensus decision 310 that the network as a whole has reached (i.e. the product of the consensus process). If any of the other validator nodes have "voted" opposite to the consensus decision 310, e.g., validator node "B" has a vote of "against" which is different than the consensus decision 310 of "for", the validator nodes 302 may store this information in a feedback registry 312 as a "bad" vote for that validator node 102. Feedback registry 312 may include, for example, an identification 314 of the validator nodes 102, and a tally of bad votes 316 for each validator node 102. For example, as shown in FIG. 3, the validator node 302 may increment the tally of bad votes 316 for validator node "B" because validator node "B" voted opposite to the consensus decision 310. In some aspects, a tie vote between validator nodes may result in a consensus decision of either "for" or "against" depending on predetermined settings of blockchain 100, e.g., settings set forth in a genesis block of blockchain 100.

In some aspects, the feedback registry 312 may be stored on each validator node 302. In some aspects, feedback registry 312 may be stored as a separate database that is associated with blockchain 100, for example, as shown in FIG. 1. For example, each validator node 302 may have access to feedback registry 312 and may update feedback registry 312 as needed when votes and consensus decisions are received. For example, each validator node 302 may broadcast and receive votes from each other validator node 302 and may determine when a consensus has been reached, for example, when a threshold number of identical votes are received. One or more of the validator nodes 302 may then update the feedback registry 312, either in the storage of the validator node 302 or in the separate database. In some aspects, feedback registry may be a decentralized database stored on nodes 200 or other computing devices associated with blockchain 100.

In some aspects, one or more of validator nodes 302 may determine, that the tally of bad votes 316 for a particular validator node 302 crosses a predetermined threshold number of "bad" votes. For example, the tally of bad votes 316 stored in the feedback registry 312 for the particular validator node 302 may have been incremented above the pre-determine threshold. In this case, the remaining validator nodes 302 of the network may wish to initiate (e.g., via a consensus decision) a process of sanctioning the "bad" validator node 302. In some aspects, the predetermined threshold may be set by a creator of the blockchain 100, for example, in a genesis block (first block) of the blockchain. In some aspects, the predetermined threshold may be set at any time via consensus between the validator nodes 302. For example, the validator nodes 302 may vote to change the predetermined threshold. As a non-limiting example, the predetermined threshold may be six bad votes. In this case, validator node "B" has reached the predetermined threshold and may be sanctioned by the rest of the validator nodes 302. For example, in some aspects, the other validator nodes 302 of blockchain 100 may vote on whether to ban the "bad" validator node 302 (e.g., validator node "B") from the blockchain. In some aspects, the ban may only be from participating in the consensus process. In some aspects, the ban may be a permanent ban. In some aspects, the ban may be a temporary ban (e.g. for a certain time period or number of consensus rounds). In some aspects, the other validator nodes 302 may vote to assign a decreased weight to the "bad" validator node's "votes" in subsequent consensus rounds.

In some aspects, the methods of sanctioning of the "bad" validator node and a trigger (e.g., the predetermined threshold) for each type of sanction may be predetermined. For example, the method of sanctioning and the respective trigger they may be defined in the blockchain 100's genesis block. In some aspects, different levels of sanctions may be implemented by the validator nodes 302 based on the bad vote count 316 of the validator node. For example, multiple predetermined thresholds may be implemented where, for example, a first method of sanctioning (e.g., temporary ban or decreased weight) may be implemented when the bad vote count 316 is above a first threshold, and a second method of sanctioning (e.g., permanent ban) may be implemented when the bad vote count 316 is above a second threshold. In some aspects, a sanctioned validator node 302 may be replaced by a new validator node 302 to maintain at least a minimum number of active validator nodes 302 in the network.

In some aspects, a passed consensus decision to sanction a validator node 302 may be added to the blockchain 100 as a transaction. For example, the passed consensus decision to sanction the validator node 302 may be added to the next block to be appended to blockchain 100.

In some aspects, a method of rehabilitation for a "bad" validator node 302 may be provided or specified, e.g., in the genesis block of the blockchain 100 or via a consensus vote among the other validator nodes 302. For example, if after sanctioning, the "bad" validator node 302 matches the consensus decision 310 a certain percentage of the time, the "bad" validator node 302's sanctioning may be removed, e.g., the bad vote count 316 may be reduced or "zeroed" out and the ban or reduction in weight may be removed.

In some cases it may be possible that even "good" validator nodes 302 may occasionally vote opposite the consensus decision 310 and may accrue a bad vote count 316. In some aspects, any validator node 302 may rehabilitate, e.g., reduce, the bad vote count 316 through good voting. For example, where each "bad" vote that is opposite the consensus decision 310 may increase the bad vote count 316 by one, one or more good votes that match the consensus decision 310 may alternatively reduce the bad vote count 316. In some aspects, for example, every "good" vote may reduce the bad vote count 316 by one. In some aspects, the bad vote count 316 may be reduced past zero such that the validator node 302 may accumulate the benefits of consistent good voting as a buffer against accumulating a bad vote count 316. For example, additional votes that are "good" may allow a validator node 302 to have a negative bad vote count 316, e.g., −4, −5, etc.

In some aspects, more than one "good" vote may be required to reduce the bad vote count 316 by one. For example, two, three, four, five, or any number of "good" votes may be required for each one point reduction to the bad vote count 316. In some aspects, the number of "good" votes may be required to be consecutive. By requiring more than one "good" vote or consecutive "good" votes, blockchain 100 may be ensured that only validator nodes 302 that consistently vote the same as the final consensus decision 310 will remain active on the blockchain 100.

The use of a built-in feedback mechanism such as the feedback registry 312 and tally of bad votes 316 described above allows the validator nodes 302 associated with blockchain 100 to correct themselves by isolating "bad" validator nodes from the consensus process. Isolating the "bad" validator nodes results in speedier consensus rounds between the validator nodes 302 since the threshold number of identical votes required for consensus will be achieved faster. This will allow the transactions to be added to blockchain 100 faster resulting in increased throughput since less time will be spent by each validator during consensus. This translates into decreased response times to client requests. The built-in feedback mechanism also provides an incentive to all validator nodes to behave properly or risk receiving a sanction.

Figure 4:
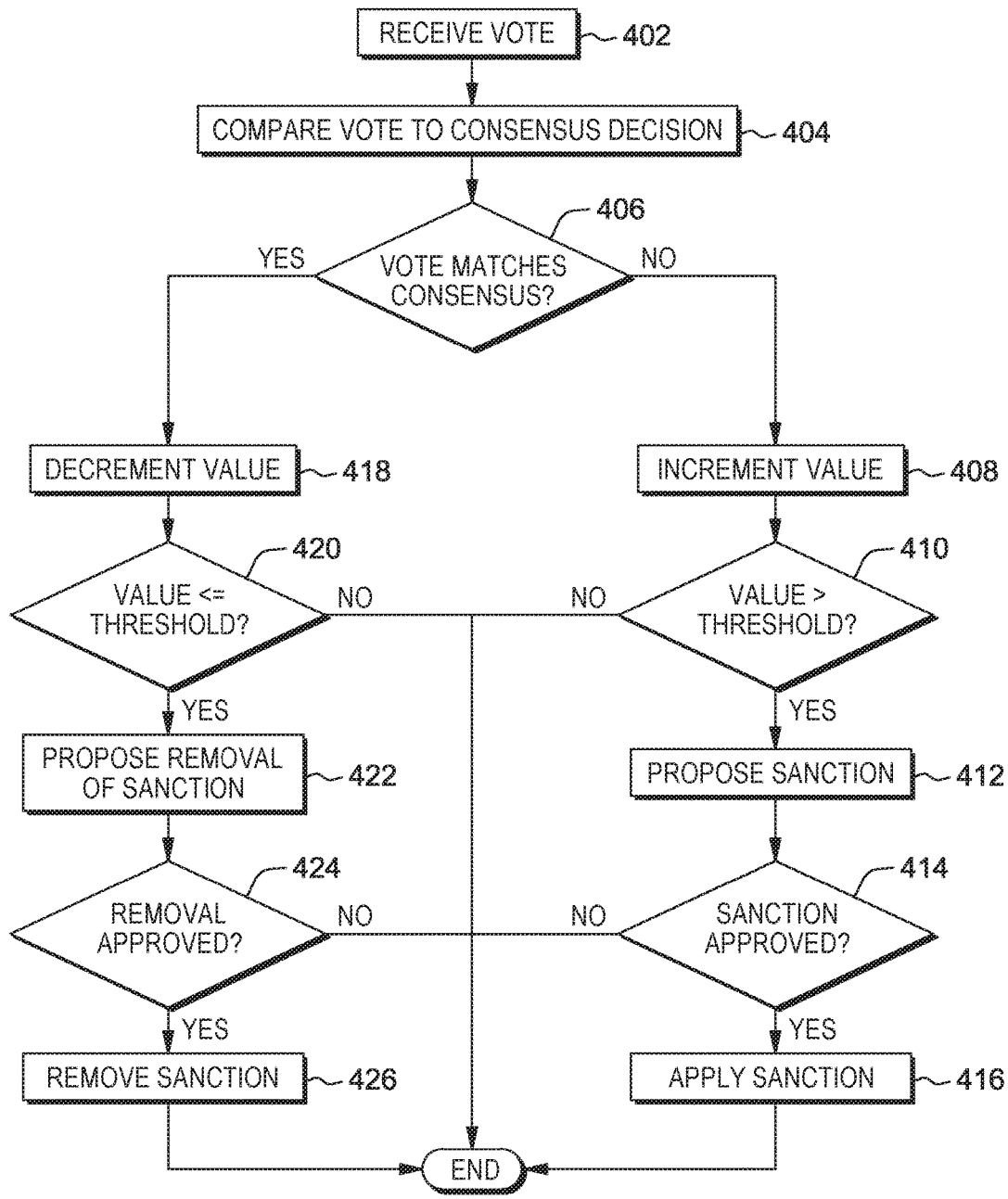
FIG. 4 is a flow chart of a method according to an embodiment of the present disclosure.

With reference now to FIG. 4, a method 400 for providing a validator node feedback mechanism for validator nodes of a blockchain for administering and removing sanctions is disclosed.

At 402, a vote by a validator node 302 associated with a blockchain 100 is received, for example, by a second validator node 302 associated with the blockchain 100. In some aspects, the vote may be received by every validator node 302 associated with the blockchain 100. The vote is a vote on whether or not to add a transaction to blockchain 100.

At 404, the vote is compared to a consensus decision on whether or not to add the transaction to the blockchain 100. In some aspects, the consensus decision may be determined by the second validator node 302, for example, based on received votes from a plurality of the validator nodes 302 associated with the blockchain 100. For example, the consensus decision may be reached once a threshold number of identical votes are received by the second validator node 302, with the consensus decision being the same as the identical votes that meet the threshold. In some aspects, the consensus decision may be received from at least one other validator node 302 by the second validator node 302. The plurality of validator nodes 302 may include the validator node 302. In some aspects, the vote may be received prior to the determination of the consensus decision, e.g., prior to a threshold number of identical votes being received. In some aspects, the vote may be received after the consensus decision has been determined/received, e.g., after the threshold number of identical votes has been received.

At 406, the second validator node 302 or another validator node associated with blockchain 100 may determine whether the vote of the validator node 302 matches the consensus decision, e.g., if the consensus decision is "for" adding the transaction, a matching vote would also be "for" adding the transaction.

At 408, if it is determined that the vote does not match the consensus decision, a value, e.g., the tally of bad votes 316, associated with a validator node 302 in a feedback registry 312 may be incremented.

At 410, a validator node or another part of blockchain 100 may determine whether the value, e.g., tally of bad votes 316, associated with the validator node 302 is above a predetermined threshold value, e.g., pre-determine number of allowed bad votes. If the value, e.g., tally of bad votes 316, is not above the predetermined threshold value, the method may end.

At 412, if it is determined that the value, e.g., tally of bad votes 316, associated with the validator node is above the predetermined threshold, a sanction of the validator node 302 may be proposed to the plurality of validators, e.g., reducing a weight of the "bad" validator node's voting during consensus, banning the "bad" validator node from voting on consensus either temporarily or permanently, or other similar sanctions. For example, the sanction may be proposed to the plurality of validator nodes 302 as another transaction 104 to be added to the blockchain 100. In some aspects, the sanction may be proposed as a special system transaction. When the system transaction is appended to the blockchain, each validator node 302 will process the system transaction internally, for example, by dropping a secure connection to the "bad" validator node, updating variables corresponding to a weight of votes issued by the "bad" validator node, or other similar processing.

At 414, the plurality of validator nodes 302 vote on the proposed sanction and determine a consensus decision in a similar manner as described above for the voting.

At 416, if the proposed sanction was approved, the proposed sanction is applied to the "bad" validator node for at least one future consensus decision, e.g., a ban, a reduced weight, or other similar sanction.

Returning now to 406, if it is determined that the vote matches the consensus decision, the value, e.g., tally of bad votes 316, for the "bad" validator node may be decremented at 418. This may be used as a mechanism to rehabilitate the "bad" validator node if the "bad" validator node starts matching the consensus decision more often.

At 420, a validator node or another part of blockchain 100 may determine whether the value, e.g., tally of bad votes 316, associated with the validator node 302 is equal to or below the predetermined threshold value. If the value, e.g., tally of bad votes 316, is not below or equal to the predetermined threshold value, the method may end.

At 422, if it is determined that the value, e.g., tally of bad votes 316, associated with the validator node is equal to or below the predetermined threshold and the validator node is currently under a sanction, a removal of the sanction of the validator node 302 may be proposed to the plurality of validator nodes 302.

At 424, the plurality of validator nodes 302 vote on the proposed removal of the sanction and determine a consensus decision in a similar manner as described above for the voting.

At 426, if the proposal to remove the sanction was approved, the sanction is removed and the "bad" validator node returns to normal participation in future consensus decisions.

Figure 5:
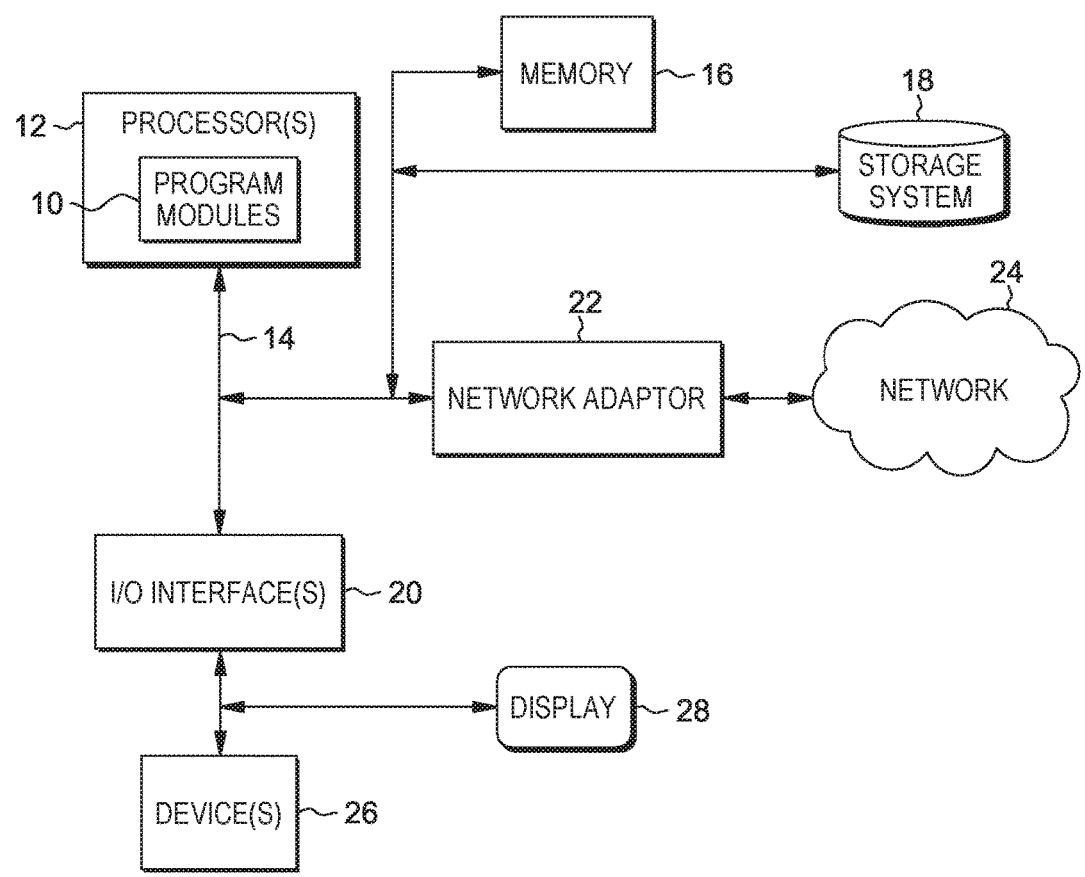
FIG. 5 is an exemplary block diagram of a computer system in which processes involved in the system, method, and computer program product described herein may be implemented.

FIG. 5 illustrates a schematic of an example computer or processing system that may implement any portion of blockchain 100, nodes 200, validator nodes 300, systems, methods, and computer program products described herein in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a software module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, etc.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method implemented by at least one hardware processor comprising:
   receiving a vote on whether to add a block of transactions to a blockchain from a validator node associated with the blockchain;
   comparing the vote to a consensus decision on whether to add the block of transactions to the blockchain, the consensus decision reached based on votes by a plurality of validator nodes of the blockchain, the plurality of validator nodes including the validator node;
   determining based on the comparison that the vote does not match the consensus decision;
   in response to determining that the vote does not match the consensus decision, incrementing a value associated with the validator node in a feedback registry;
   determining that the value associated with the validator node is above a predetermined threshold value; and
   in response to determining that the value associated with the validator node is above the predetermined threshold value, proposing a sanction of the validator node to the plurality of validator nodes;
   receiving from the plurality of validator nodes a consensus decision on the sanction; and
   applying the received consensus on the sanction to at least one future vote received from the validator node.

2. The method of claim 1, wherein the proposed sanction comprises banning the validator node from participating in consensus decisions for a predetermined period of time.

3. The method of claim 2, wherein the predetermined period of time is a permanent ban of the validator node.

4. The method of claim 1, wherein said votes of said plurality of validator nodes of the blockchain are assigned a weight in a subsequent consensus round, the proposed sanction comprises decreasing a weight of the validator node's vote on at least one future consensus decision relative to the weights of the votes of the plurality of validator nodes.

5. The method of claim 1, wherein the sanction is predefined in a genesis block of the blockchain.

6. The method of claim 1, wherein the predetermined threshold value is defined in a genesis block of the blockchain.

7. The method of claim 1, wherein the received consensus decision on the sanction is an approval of the sanction, the method further comprising proposing appending the consensus decision on the sanction to the blockchain.

8. The method of claim 1, further comprising:
 receiving a second vote on whether to add a second transaction to the blockchain from the validator node;
 comparing the second vote to a second consensus decision on whether to add the second transaction to the blockchain, the second consensus decision reached based on votes by the plurality of validator nodes of the blockchain;
 determining based on the comparison of the second vote to the second consensus decision, that the second vote matches the second consensus decision;
 in response to determining that the second vote matches the second consensus decision, decrementing the value associated with the validator node in the feedback registry;
 determining that the value associated with the validator node is equal to or below the predetermined threshold value; and
 in response to determining that the value associated with the validator node is equal to or below the predetermined threshold value, proposing a removal of the sanction to the plurality of validator nodes.

9. A system comprising:
 at least one hardware processor configured to:
  receive a vote on whether to add a transaction to a blockchain from a validator node associated with the blockchain;
  compare the vote to a consensus decision on whether to add the transaction to the blockchain, the consensus decision reached based on votes by a plurality of validator nodes associated with the blockchain, the plurality of validator nodes including the validator node;
  determine based on the comparison that the vote does not match the consensus decision;
  in response to determining that the vote does not match the consensus decision, increment a value associated with the validator node in a feedback registry;
  determine that the value associated with the validator node is above a predetermined threshold value; and
  in response to determining that the value associated with the validator node is above the predetermined threshold value, propose a sanction of the validator node to the plurality of validator nodes;
  receive from the plurality of validator nodes a consensus decision on the sanction; and
  applying the received consensus decision on the sanction to at least one future vote received from the validator node.

10. The system of claim 9, wherein the proposed sanction comprises banning the validator node from participating in consensus decisions for a predetermined period of time.

11. The system of claim 10, wherein the predetermined period of time is a permanent ban of the validator node.

12. The system of claim 9, wherein said votes of said plurality of validator nodes of the blockchain are assigned a weight in a subsequent consensus round, the proposed sanction comprises decreasing a weight of the validator node's vote on at least one future consensus decision relative to the weights of the votes of the plurality of validator nodes.

13. The system of claim 9, wherein the sanction is predefined in a genesis block of the blockchain.

14. The system of claim 9, wherein the predetermined threshold value is defined in a genesis block of the blockchain.

15. The system of claim 9, wherein the received consensus decision is an approval of the sanction, the at least one processor further configured to propose appending the consensus decision on the sanction to the blockchain.

16. The system of claim 9, wherein the at least one processor is further configured to:
 receive a second vote on whether to add a second transaction to the blockchain from the validator node;
 compare the second vote to a second consensus decision on whether to add the second transaction to the blockchain, the second consensus decision reached based on votes by the plurality of validator nodes of the blockchain;
 determine based on the comparison to the second consensus decision that the second vote matches the second consensus decision;
 in response to determining that the second vote matches the second consensus decision, decrement the value associated with the validator node in the feedback registry;
 determine that the value associated with the validator node is equal to or below the predetermined threshold value; and
 in response to determining that the value associated with the validator node is equal to or below the predetermined threshold value, propose a removal of the sanction to the plurality of validator nodes.

17. A non-transitory computer readable medium comprising instructions that when executed by at least one hardware processor, configure the at least one hardware processor to:
 receive a vote on whether to add a transaction to a blockchain from a validator node associated with the blockchain;
 compare the vote to a consensus decision on whether to add the transaction to the blockchain, the consensus decision reached based on votes by a plurality of validator nodes associated with the blockchain, the plurality of validator nodes including the validator node;
 determine based on the comparison that the vote does not match the consensus decision;
 in response to determining that the vote does not match the consensus decision, increment a value associated with the validator node in a feedback registry;
 determine that the value associated with the validator node is above a predetermined threshold value; and
 in response to determining that the value associated with the validator node is above the predetermined threshold value, propose a sanction of the validator node to the plurality of validator nodes;

receive from the plurality of validator nodes a consensus decision on the sanction; and apply the received consensus decision on the sanction to at least one future vote received from the validator node.

18. The non-transitory computer readable medium of claim 17, wherein said votes of said plurality of validator nodes of the blockchain are assigned a weight in a subsequent consensus round, the proposed sanction comprises at least one of: banning the validator node from participating in consensus decisions for a predetermined period of time and decreasing a weight of the validator node's vote on at least one future consensus decision relative to the weights assigned to the votes of the other validator nodes of the plurality of validator nodes.

19. The non-transitory computer readable medium of claim 17, wherein the received consensus decision is an approval of the sanction, the at least one processor is further configured to propose appending the consensus decision on the sanction to the blockchain.

20. The non-transitory computer readable medium of claim 17, wherein the at least one processor is further configured to:
receive a second vote on whether to add a second transaction to the blockchain from the validator node;
compare the second vote to a second consensus decision on whether to add the second transaction to the blockchain, the second consensus decision reached based on votes by the plurality of validator nodes of the blockchain;
determine based on the comparison that the second vote matches the second consensus decision;
in response to determining that the second vote matches the second consensus decision, decrement the value associated with the validator node in the feedback registry;
determine that the value associated with the validator node is equal to or below the predetermined threshold value; and
in response to determining that the value associated with the validator node is equal to or below the predetermined threshold value, propose a removal of the sanction to the plurality of validator nodes.

* * * * *